INVENTOR.
Karl R. Larson
BY Robert M. Danning

Patented Feb. 5, 1952

2,584,356

UNITED STATES PATENT OFFICE 2,584,356

VARIABLE WEIGHT SINKER

Karl R. Larson, Aitkin, Minn.

Application August 13, 1948, Serial No. 44,151

4 Claims. (Cl. 43—43.14)

My invention relates to an improvement in variable weight sinker and deals particularly with a type of sinker used for fishing and similar purposes.

Sinkers used for weighting lines to be used in fishing and the like are usually constructed in numerous sizes to produce sinkers of different weights. The weight which is used upon the line depends upon the bait used, the type of fishing, and the depth to which the hook is suspended. A person who fishes for fish of various types must usually carry a variety of sinkers of various sizes so as to be able to have a sinker of the proper weight for every purpose.

A feature of the present invention lies in the provision of a supporting member having a series of weights removably supported thereupon. When all of the weights are supported upon the supporting member, the sinker is of its maximum weight. By removing one or more of the weights from the holder, the weight of the sinker may be decreased. A sinker of adjustable weight is thus produced.

A feature of the present invention lies in the provision of an elongated support which is capable of slidably rotatably supporting a series of weights. These weights are singly removable from the support and may be individually replaced thereupon. As the sinker is used the number of weights may be varied to suit the type of fishing and to accommodate varying conditions.

A feature of the present invention lies in the provision of a flat holder having an elongated slot therein which is enlarged at one end. The weights are generally cylindrical members having a central peripheral groove therein. This groove in each of the weights may accommodate the sides of the holder on opposite sides of the slot and thus the various weights may be threaded onto the holder and engaged in series in the slot. The sinker is designed to be supported in series at one end of the line usually between the line and the leader or between the line and the hook or bait arrangement used.

These and other objects and novel features of my invention will be more clearly and fully set forth in the following specification and claims.

In the drawings forming a part of my specification:

Figure 1:
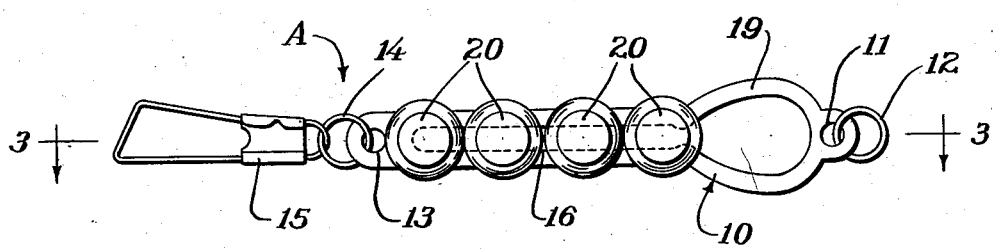
Figure 1 is a top plan view of the apparatus showing the construction thereof.
Figure 2:
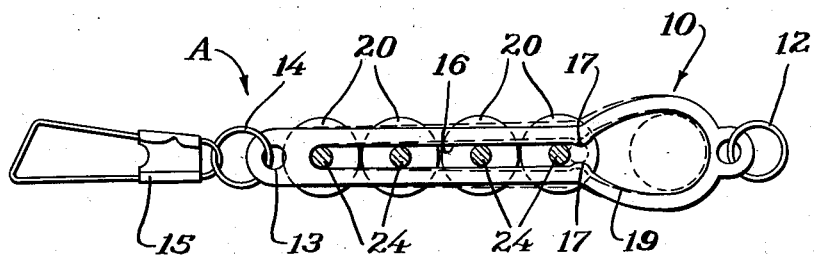
Figure 2 is a sectional view through the apparatus adjacent the weight supporting device, the position of the section being indicated by the line 2—2 of Figure 3.
Figure 3:
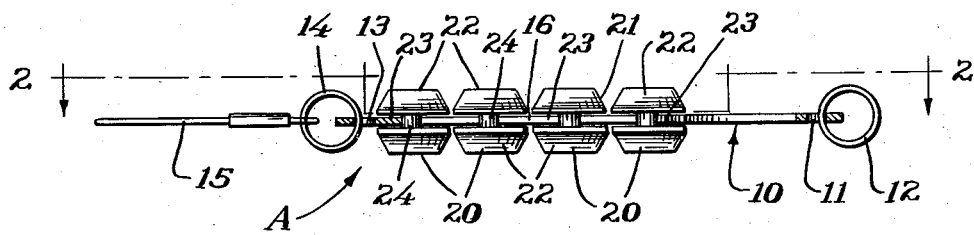
Figure 3 is a sectional view longitudinally of the supporting device, showing the weights, rings and hook in elevation, the position of the section being indicated by the line 3—3 of Figure 1.

The sinker A is usually interposed in a fishing line near the hook or leader. The sinker includes an elongated body 10 having an aperture 11 near one end thereof designed to accommodate a ring 12. The ring 12 may be attached to the fishing line, to a swivel, a leader, or the like. An aperture 13 is provided near the opposite end of the body 10. A ring 14 extends through the aperture 13 and connects the body 10 with a snap hook 15 which is designed to removably connect the sinker to the hook, a leader, a lure, or similar structure. The snap hook 15 is of common construction and operates much in the manner of a safety pin. The snap hook 15 may be of any desired type as it forms no part of the present invention.

The elongated body 10 is provided with a slot 16 therein which extends the major portion of the length of the body. The slot 16 is of substantially constant width throughout most of the length. Near one end of the body the slot is constricted in width by a pair of inwardly projecting ears 17. Beyond the ears 17 the slot widens to form an open loop 19. At this point the body is widened substantially for a purpose which will be later described in detail. Weights 20 are slidably, rotatably and adjustably supported upon the body 10. These weights 20 may be of any desired outward shape and include a generally cylindrical central body portion 21 which may be provided with inwardly tapering sides 22. One form of weight that I use is circular in outline so as to provide for rolling contact with an adjacent weight when their peripheral surfaces are in frictional contact with each other. A circumferential slot 23 is provided in the central cylindrical portion of the body so as to produce in effect a pair of generally circular weights connected by an integral cylindrical shank or pintle 24 of reduced diameter. The shanks 24 are of proper diameter to fit snugly within the slot 16 and be capable of rotating and sliding longitudinally therein. However, the shanks 24 are of slightly larger diameter than the distance between the ears 17 so that the ears must be spread apart slightly in order to move the shanks 24 past these ears. The shanks, due to their cylindrical shape, can move past the ears with a rotating movement.

The weights 20 are mounted upon the body 10 by inserting each individual weight one-half way through the loop opening 19 at one end of the body and then moving the weight longitudinally by a rolling, sliding, or a combined rolling and sliding movement as the shank 24 of the weight bears against the ears 17. By exerting longitudinal force upon the weight the resilience of the metal or other material forming the body 10 permits the spreading apart of the ears so that the shank may be rolled or slid into the slot 16 by a combined rolling and sliding movement. The desired number of weights may be added to the body until no more weights can be accommodated in the slot 16. The length of the slot 16 is greater than the total distance between the farthest points on the shanks of the end weights in the slot thus providing sufficient space between the peripheries of the weights so that they can freely rotate relative to each other when they are assembled in the slot.

If the sinker is too heavy, one or more of the weights 20 may be removed by sliding, rolling or by combined rolling and sliding movement of the weight nearest the loop end 19 against the ears 17, spreading apart the ears sufficiently to allow the shank 24 of the weight to pass therebetween, registering the weight 20 with the loop 19, and moving the weight axially to disengage the weight from the holder.

It will be obvious that the sinker may be used without any of the weights 20 or may have any number of weights supported in the slot 16 to the maximum number of weights the slot will accommodate. Thus the weight of the sinker may be varied between predetermined limits and a single sinker may be used to weight the fishing line under various conditions.

In accordance with the patent statutes, I have described the principles of construction and operation of my variable weight sinker, and while I have endeavored to set forth the best embodiment thereof, I desire to have it understood that obvious changes may be made within the scope of the following claims without departing from the spirit of my invention.

I claim:

1. A sinker comprising a frame having one or more portions adjacent ends thereof constituting attaching means, and adjacent openings of different lengths in communication with each other, inwardly projecting means between said openings providing a space of less width than said openings constituting a passageway between said openings, one or more weights adapted to be positioned within the openings for retention in one of them and to be readily removable therefrom, each weight comprising a spool shaped member consisting of two spaced parts and a pintle connecting said parts, said pintle having a width dimension greater than the space constituting said passageway, one of said openings being of sufficient length to accommodate one or more pintles of said weights and having a space between opposite walls thereof not less than the width of a pintle, the other opening having a configuration greater than the configuration of the spool shaped member, the configuration of the spool shaped member being such that a plurality of members may assume slightly spaced relation to each other when said one of said openings is completely filled with weights, and the other opening permitting the passage of any of the weights therethrough with the pintle of the weight maintained substantially perpendicular to the opening, said pintles being adapted to move from one of said openings to the other by a rolling, sliding, or a combined rolling and sliding action, and whereby the peripheral surfaces of said weights are adapted to have a rolling or sliding, or a combined rolling and sliding movement with respect to other weights or obstructions which the weights may encounter.

2. The structure described in claim 1 and in which the weights are circular in outline.

3. The structure described in claim 1 and in which the frame is elongated and the connected openings are longitudinally spaced, and in which the portion of the frame containing said one opening is transversely narrower than the weights supported therein.

4. A sinker comprising a frame having a plurality of openings, one or more of said openings constituting attaching means, two of the remaining openings being connected, said latter openings having therebetween inwardly extending projection means defining the adjacent boundaries between the latter openings, and one or more weights adapted to be positioned within the latter openings for retention in one of said latter openings and to be readily removable therefrom, each weight comprising a member of spool shape circular in outline and consisting of two end parts and a cylindrical shank connecting said parts, said shank being of greater diameter than the space between the projections, one of said last named openings having greater length than width and being not less than the diameter of the shank in width, said one last named opening being of a length to accommodate one or more weights, the external diameter of the weights being such that the weights may assume slightly spaced relation to other weights when the said one last named opening is completely filled with weights, and the remaining of said last named openings having a length and width of such size as to permit the passage therethrough of any of the weights with the shank of the weight maintained substantially perpendicular to the plane of said opening, said shanks being adapted to move from one of the last named openings into the other by rolling or sliding, or a combined rolling and sliding action and whereby said weights have their peripheral surfaces adapted to have a rolling or sliding or a combined rolling and sliding movement with respect to other weights or obstruction which the weights may encounter.

KARL R. LARSON.

REFERENCES CITED

The following references are of record in the file of this patent:

UNITED STATES PATENTS

| Number | Name | Date |
| --- | --- | --- |
| 535,609 | Bancroft | Mar. 12, 1895 |
| 1,500,463 | Mattern | July 8, 1924 |

FOREIGN PATENTS

| Number | Country | Date |
| --- | --- | --- |
| 137,731 | Germany | Jan. 6, 1903 |
| 226,593 | Germany | Oct. 6, 1910 |
| 52,019 | Sweden | June 21, 1922 |